United States Patent
Beck

(10) Patent No.: US 10,583,416 B2
(45) Date of Patent: Mar. 10, 2020

(54) AEROSOL GENERATOR, IN PARTICULAR SOOT GENERATOR

(71) Applicant: MAN TRUCK & BUS AG, München (DE)

(72) Inventor: Harald Beck, Burgthann (DE)

(73) Assignee: MAN Truck & Bus AG, Munich (DE)

( * ) Notice: Subject to any disclaimer, the term of this patent is extended or adjusted under 35 U.S.C. 154(b) by 114 days.

(21) Appl. No.: 15/257,675

(22) Filed: Sep. 6, 2016

(65) Prior Publication Data

US 2017/0073230 A1    Mar. 16, 2017

(30) Foreign Application Priority Data

Sep. 10, 2015 (DE) .................. 10 2015 011 853

(51) Int. Cl.
| | |
|---|---|
| *F23D 14/22* | (2006.01) |
| *C09C 1/44* | (2006.01) |
| *C09C 1/48* | (2006.01) |
| *C01B 32/05* | (2017.01) |
| *B01J 13/00* | (2006.01) |
| *B01J 19/24* | (2006.01) |

(52) U.S. Cl.
CPC .......... *B01J 19/24* (2013.01); *B01J 13/0095* (2013.01); *C01B 32/05* (2017.08); *C09C 1/44* (2013.01); *C09C 1/48* (2013.01); *F23D 14/22* (2013.01); *B01J 2219/00157* (2013.01); *B01J 2219/00164* (2013.01); *B01J 2219/24* (2013.01)

(58) Field of Classification Search
CPC .......... C01B 31/00–32/05; B01J 13/00–19/24; C09C 1/44–48
See application file for complete search history.

(56) References Cited

U.S. PATENT DOCUMENTS

| | | | |
|---|---|---|---|
| 4,751,069 A | 6/1988 | Ducote et al. | |
| 8,372,187 B2 * | 2/2013 | Gidney | C09C 1/48 73/28.01 |
| 9,416,965 B2 * | 8/2016 | Wieck | F23D 14/22 |
| 9,645,049 B2 * | 5/2017 | Black | G01M 15/108 |
| 2007/0264172 A1 | 11/2007 | Mosimann et al. | |

(Continued)

FOREIGN PATENT DOCUMENTS

| | | |
|---|---|---|
| CN | 103765100 | 4/2014 |
| CN | 104854195 | 8/2015 |

(Continued)

OTHER PUBLICATIONS

Machine Translation of WO2014085941 published Jun. 2014. (Year: 2014).*

(Continued)

*Primary Examiner* — Colleen P Dunn
(74) *Attorney, Agent, or Firm* — Cozen O'Connor

(57) ABSTRACT

An aerosol generator, in particular a soot generator. The aerosol generator includes a combustion chamber, in which fuel can be burned with an oxidizing agent in at least one soot-particle-creating flame, and a fluid feeding device for feeding fuel and an oxidizing agent into the combustion chamber. The fluid feeding device has at least three feed lines, the outlet-side end portions of which run parallel, so that at least three fluids of different types, in particular gases, can be introduced into the combustion chamber unmixed and in a parallel inflow direction.

3 Claims, 3 Drawing Sheets

(56) References Cited

U.S. PATENT DOCUMENTS

2008/0053195 A1  3/2008 Matter et al.
2013/0323656 A1  12/2013 Wieck et al.
2015/0283533 A1* 10/2015 Jing ........................ F23D 5/045
                                                        252/408.1

FOREIGN PATENT DOCUMENTS

| DE | 102011011207 | 8/2012 |
| EP | 0 353 746 | 2/1990 |
| EP | 1 055 877 | 11/2000 |
| EP | 1 590 408 | 11/2005 |
| TW | 200521383 | 7/2005 |
| WO | WO 2005/026616 | 3/2005 |
| WO | WO 2009/020958 | 2/2009 |
| WO | WO 2014/085941 | 6/2014 |
| WO | WO2014085941 A1 * | 6/2014 |

OTHER PUBLICATIONS

Lianpeng Jing: "Generation of Combustion Soot Particles for Calibration Purposes" 2nd ETH Work-shop, "Nanoparticle Measurement", ETH Hönggerberg Zürich, 7. Aug. 1998.
Search Report dated Dec. 23, 2016 which issued in the corresponding European Patent Application No. 16001796.8.

* cited by examiner

AEROSOL GENERATOR, IN PARTICULAR SOOT GENERATOR

BACKGROUND OF THE INVENTION

1. Field of the Invention

The invention relates to an aerosol generator, in particular a soot generator, and a method for creating an aerosol, in particular a method for creating soot.

2. Description of the Related Art

To reduce particles from the exhaust gas of an engine, particle-reducing components are used, such as filter systems and/or catalytic converters. The filter systems that are used today differ essentially by the type of regeneration (burning off of the soot) they employ. Active regeneration is the term used here for the deliberate burning off of the soot for a limited time and passive regeneration is the term used here for the continuous breakdown of soot, ideally in dynamic equilibrium. For the technical testing of the filtering efficiency or the reactivity of soots, model soots and actual soots are used. At present, various particle measuring techniques, which determine the particle mass and the number of particles, are used for testing the legally limited emission of particles. At present, there are no standardized particle aerosols being used for the validation and calibration of these particle measuring techniques.

Apart from internal combustion engines, currently various soot generators are used for producing soot particles.

EP 0 353 746 A2 describes a device that creates soot particles by a spark discharge at graphite electrodes. U.S. Pat. No. 4,751,069 A describes a system for creating soot particles by cracking carbon-containing materials at high temperatures. EP 1 055 877 B1 describes a burner for creating soot particles that burns a combustible gas and an oxidizing gas in a combustion chamber. A refinement of this burner is described in EP 1 590 408 B1. A further refinement is described in WO 2014/085941 A1, which describes the use of a liquid fuel for creating soot particles.

A disadvantage of the known devices is that the chemical composition of the particles and also the particle morphology, i.e. the size and nature of the particles created of the aerosol, cannot be influenced, or influenced only to a limited extent.

SUMMARY OF THE INVENTION

An object of the invention is providing an improved device for creating model aerosols, in particular soot, with which disadvantages of conventional techniques can be avoided. An object of the invention is providing an aerosol generator, in particular a soot generator that makes it possible to exert a direct influence on the chemical composition and/or morphology of the particles created. A further object is that of providing a method for creating an aerosol or soot with which disadvantages of conventional methods can be avoided.

According to a first aspect of the invention, an aerosol generator, in particular a soot generator, comprises a combustion chamber, in which fuel can be burned with an oxidizing agent in at least one soot-particle-creating flame, and a fluid feeding device for feeding fuel and an oxidizing agent into the combustion chamber.

The fluid feeding device is distinguished by the fact that the fluid feeding device has at least three feed lines for a fluid, the outlet-side end portions of which are parallel, so that at least three fluids of different types, in particular gases, can be introduced into the combustion chamber unmixed and in a parallel inflow direction. The fluids, in particular gases, are consequently conducted separately into the combustion chamber and to the flame. The inflow direction is the average direction of flow of the fluid stream that flows out at the outlet of the feed line and enters the combustion chamber.

This arrangement of the feed lines offers the advantage that a number of combustible gases and/or oxidizing gases of different types and/or inert gases can be conducted into a combustion chamber. The combination of at least three feed lines and a parallel inflow direction makes a flexible combination and composition of the components of the gas mixture that can be burned in the flame possible, in order to bring about a desired particle morphology and/or chemical composition of the particles.

According to a preferred embodiment, the end portions of the at least three feed lines may be arranged coaxially in one another. In other words, according to this embodiment the end portions have diameters of different sizes and are arranged nested coaxially in one another. This makes a compact arrangement of the end portions of the feed lines possible, in order to introduce the different gases into the combustion chamber as far as possible at the same point, or at the point at which the flame is created.

According to an alternative embodiment, the end portions may be arranged lying parallel next to one another. In particular when there are a large number of feed lines, this embodiment can be produced with little effort. In the case of an advantageous variant of this embodiment, the end portions are arranged parallel next to one another to form an arrangement of lines with a packing density that is as great as possible.

According to a preferred embodiment, the fluid feeding device has at least four feed lines. According to this variant, for example, at least two different combustible gases, an oxidizing gas and a further inert gas or reactive gas can be introduced into the combustion chamber. A reactive gas is a gas with so-called heteroatoms (non-carbon atoms), such as for example nitrogen, sulphur or other elements. On account of their nature, these reactive gases can act as an oxidizing agent (for example $SO_2$, $NO_2$) or as a reducing agent (for example $NH_3$, $H_2S$, $N_2O$). A variant of this embodiment therefore provides that the fluid feeding device has four or more feed lines.

A further advantageous variant of this embodiment provides that the fluid feeding device has seven feed lines. This variant offers still greater flexibility in setting the composition of the gas mixture that is burned in the flame. A further advantage is that, with seven feed lines, their seven parallel end portions can be arranged with a packing density that is as great as possible. For this purpose, the end portions are arranged parallel next to one another, one of the end portions being arranged in the middle, while the six remaining end portions are arranged uniformly distributed around the circumference and at as little distance as possible from the end portion that is arranged in the middle.

It is also particularly advantageous if the outlets of the feed lines are located at the same height with respect to the inflow direction, so that the gases are introduced into the combustion chamber as close to one another as possible and as far as possible mix at the same time.

In a preferred exemplary embodiment, a first of the feed lines is connected on the inlet side to a first fluid container (fuel container), containing a first fuel. Furthermore, a second of the feed lines is connected on the inlet side to a second fluid container (fuel container), containing a second fuel. The first fuel may be a first combustible gas and the second fuel may be a second combustible gas that is different from the first combustible gas. Examples of such combustible gases are hydrogen ($H_2$), propane ($C_3H_8$) or ethine or acetylene ($C_2H_2$).

A further advantageous possibility for realizing the invention is a third of the feed lines are connected on the inlet side to a third fluid container containing an oxidizing gas. Likewise possible is the use of one or more oxidizing gases with different oxygen components, for example air, oxygen, or ozone, which are conducted into the combustion chamber by way of separate feed lines in each case. According to this variant, then at least two feed lines of the fluid feeding device are connected on the inlet side in each case to respective a container that contains an oxidizing gas, different oxidizing gases being stored in the containers.

Furthermore, at least one of the feed lines may be connected on the inlet side to a fluid container, which contains a reactive gas. In this way, one or more different reactive gases can be introduced into the combustion chamber.

Furthermore, the aerosol generator may be formed such that at least one of the feed lines is connected on the inlet side to a fluid container, which contains a so-called inert gas. Inert gases are distinguished by the fact that they do not take part directly in the combustion. Possible inert gases are, for example, $N_2$, $CO_2$ or noble gases. In this way, one or more different inert gases can be introduced into the combustion chamber, in order to influence the physical-chemical boundary conditions of the combustion, and as a result the particle morphology.

Furthermore, the aerosol generator may have a regulator, by which a fluid flow rate can be set in each of the feed lines. The regulator may for example be a valve arrangement, such that each feed line has at least one valve, by which a flow rate through the feed line can be set. In this way, the mixing ratio of the gases fed in can be varied and in this way a direct influence can be exerted on the morphology (size and nature) of the particles generated and on the chemical composition of the particles.

Thus, for example, increasing the acetylene component in the combustible gas mixture leads to a greater carbon component in the combustible gas, and consequently to a greater formation of soot in the flame. Increasing the hydrogen component leads to a greater carbon component in the particles formed. The use of pure hydrogen leads to a flame that is free from soot. In this case, the emission of particles may be caused for example by other reactive or inert gas components, for example sulphur-containing particles due to the use of $SO_2$ and/or $H_2S$.

According to a second aspect of the invention, a method for creating an aerosol, in particular a method for creating soot, is provided, in which method at least one fuel and an oxidizing agent are fed to a combustion chamber by an aerosol generator as disclosed in this document, and a soot-particle-creating flame, in particular a diffusion flame, is formed in the combustion chamber.

An advantageous variant provides here that, by an aerosol generator with at least four feed lines, at least two combustible gases, at least one oxidizing gas and at least one reactive gas or inert gas are introduced into the combustion chamber.

The invention also relates to a method for testing or calibrating a particle measuring device, particle sensor, particle filter or particle catalyst, characterized in that, for testing or calibrating such a device, it is fed an aerosol, in particular soot particles, which are created by an aerosol generator as disclosed in this document or by means of a method as disclosed in this document.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The preferred embodiments and features of the invention that are described above can be combined with one another as desired. Further details and advantages of the invention are described below with reference to the accompanying drawings, in which.

DETAILED DESCRIPTION OF THE PRESENTLY PREFERRED EMBODIMENTS

Elements that are the same or functionally equivalent are denoted by the same designations in all of the figures.

Figure 1:
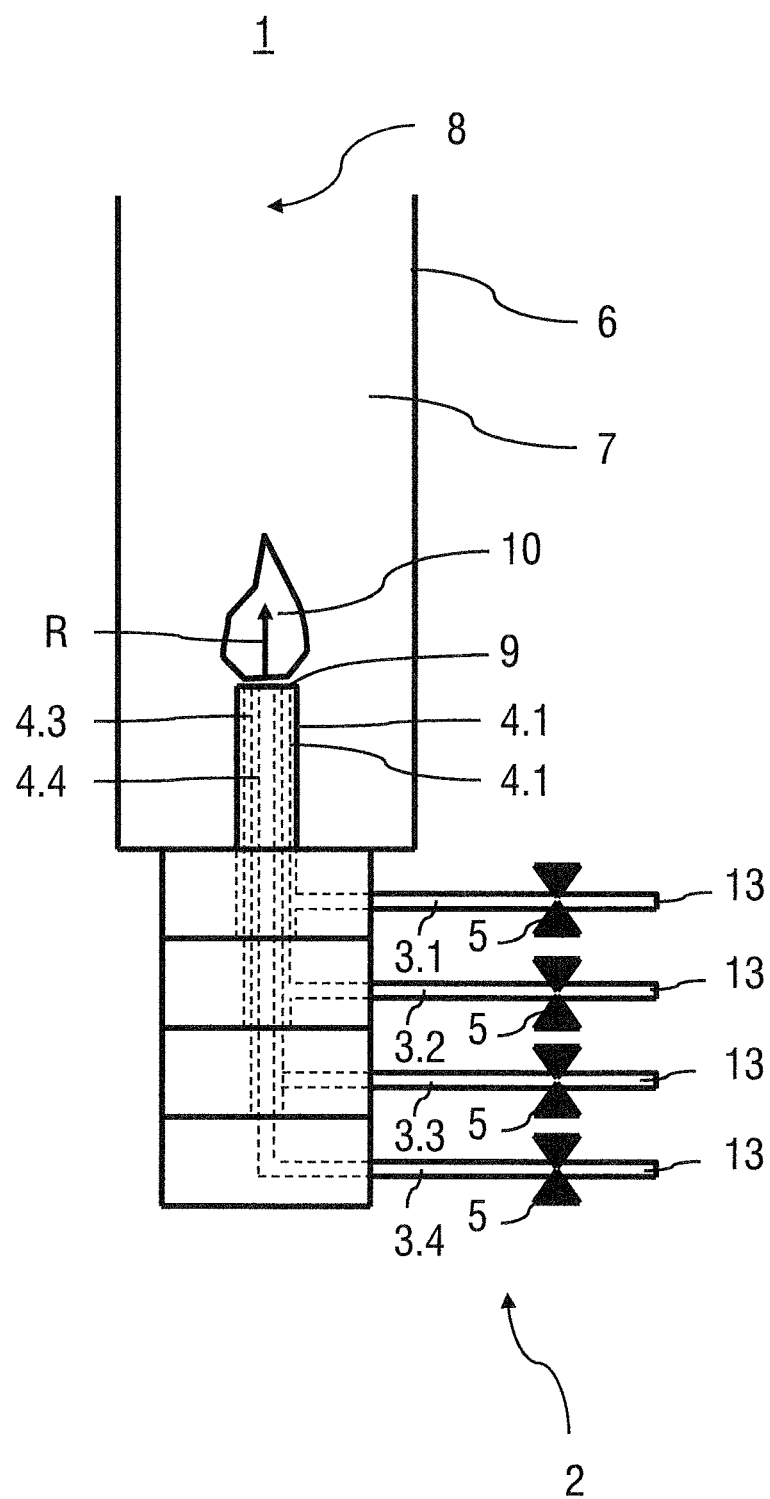
FIG. 1 is a schematic representation of a soot generator.

FIG. 1 schematically shows a cross section of an exemplary embodiment of the soot generator 1 according to the invention.

The soot generator represented in FIG. 1 comprises a combustion chamber 7, in which at least one fuel with an oxidizing agent can be burned in at least one soot-particle-creating flame 10. The combustion chamber 7 may be embodied in a way known per se and be formed for example by a cylindrical outer tube 6, at the lower end of which an end portion of a fluid feeding device 2 protrudes into the combustion chamber 7.

The fluid feeding device 2 can be used for introducing combustible gases, an oxidizing gas and possibly further gases, such as a reactive gas or an inert gas, into the combustion chamber.

In the example shown, the fluid feeding device 2 has four feed lines 3.1, 3.2, 3.3 and 3.4. However, it is emphasized that the fluid feeding device may also have a greater number n of feed lines.

The outlet-side end portions 4.1, 4.2, 4.3 and 4.4 of the feed lines 3.1, 3.2, 3.3 and 3.4 run parallel, the outlets 9 of the feed lines being located at a same height with respect to the inflow direction R. In this way, in the exemplary embodiment shown four gases of different types can be introduced into the combustion chamber 7 separately and in a parallel inflow direction. The inflow direction of the gases emerging from the outlets 9 of the feed lines is indicated by the arrow identified by the designation R.

The end portions 4.1, 4.2, 4.3 and 4.4 of the feed lines 3.1, 3.2, 3.3 and 3.4 are arranged nested coaxially in one another, which is represented in FIG. 1 by the dashed lines. The feed line 3.4 for example goes over into a cylindrical inner tube portion 4.4, which runs coaxially and inside the tube portion 4.3 of the feed line 3.3. The feed line 3.2 goes into a tube portion 4.2, inside which there runs the tube portion 4.3. The feed line 3.1 goes into an outer tube portion 4.1, inside which there runs the tube portion 4.2.

Figure 2A:
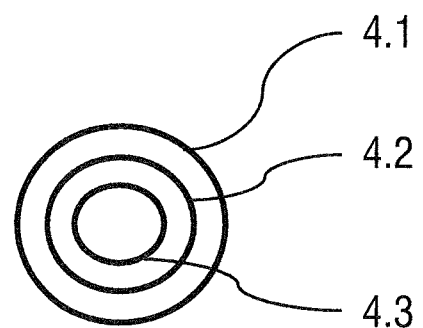
FIGS. 2A and 2B are sectional views of an outlet-side end portion of the fluid feeding device.
Figure 2B:
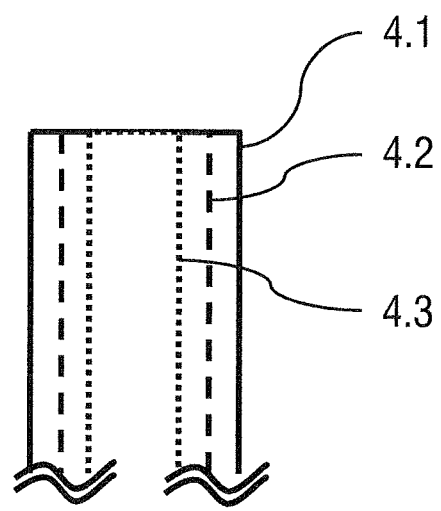

Such an arrangement of the respective end portions of the feed lines nested coaxially in one another is illustrated once again in FIGS. 2A and 2B, but for an exemplary embodiment with three feed lines. FIG. 2A shows here a plan view of the outlets 9 of the end portions 4.1, 4.2 and 4.3, while FIG. 2B shows a sectional view along the direction of flow.

The inlet 13 of one of the feed lines is connected to a fluid container (not represented), in which an oxidizing agent is stored, so that an oxidizing agent stored therein can be conducted with a certain inflow rate through the outlet 9 of the corresponding end portion into the combustion chamber 7. Respective inflow rates can be set by way of a valve 5.

Correspondingly, the inlets 13 of two more of the feed lines are respectively connected to different fuel containers, different combustible gases being stored in the fuel containers. In this way, two different combustible gases can be conducted into the combustion chamber 7. The inflow rate in each feed line can in turn be set by way of a valve 5.

The inlet of the fourth feed line can be connected or is connected to a fluid container (not represented), in which a reactive gas or an inert gas is stored, so that a reactive gas or an inert gas can be conducted with a certain inflow rate through the outlet 9 of the corresponding end portion into the combustion chamber 7. The inflow rate can in turn be set by way of a valve 5.

The fluid or fuel containers may for example be in each case a gas bottle, in which a gas is stored under positive pressure. For regulating the inflow rate, the valves 5 may be embodied as reducing valves.

After ignition, a flame 10, in which soot particles are formed as a result of combustion of the fuel with the oxidizing gas, forms over the outlets 9 of the feed lines 3.1 to 3.4.

By setting the inflow rates by way of the valves 5, the mixing ratio of the gases fed in can be varied, and consequently a direct influence can be exerted on the morphology (size and nature) of the particles generated and also on the chemical composition of the particles. Consequently, factors that influence the combustion, and with it the particle formation, can be varied independently of one another. If one of the combustible gases fed in is acetylene, then, for example, increasing the acetylene component in the combustible gas mixture leads to a greater carbon component in the combustible gas, and consequently to a greater formation of soot in the flame. If one of the combustible gases fed in is hydrogen, then increasing the hydrogen component leads to a greater carbon content in the particles formed. The use of pure hydrogen leads to a flame that is free from soot. In this case, the emission of particles may be caused for example by other reactive or inert gas components, for example sulphur-containing particles due to the use of $SO_2$ and/or $H_2S$.

The upper end 8 of the combustion chamber may be embodied in a way known per se. For example, an aerosol or soot discharging line (not represented) may be provided, with a mouth opening into the combustion chamber, through which soot particles and/or aerosols formed in the combustion chamber can be discharged.

Figure 3:
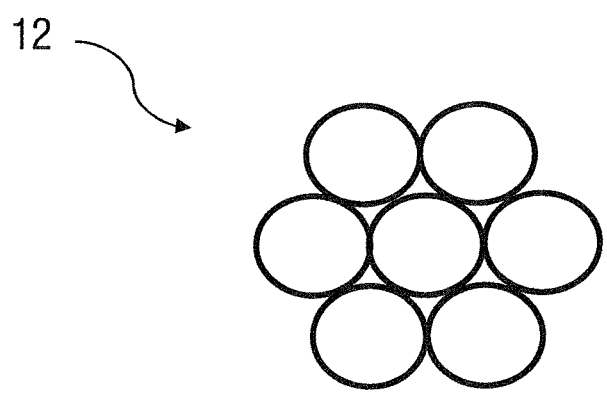
FIG. 3 is a sectional view of an outlet-side end portion of the fluid feeding device.

FIG. 3 illustrates a further variant of an embodiment of the feeding device, a plan view of the outlets 9 of the end portion of the feeding device that opens out into the combustion chamber being shown. As can be seen in FIG. 3, a special feature of this variant of the embodiment is that the feeding device has seven separate feed lines, the end portions of which are arranged parallel next to one another to form an arrangement of lines 12 with a packing density that is as great as possible. For this purpose, the end portions are arranged parallel next to one another, one of the end portions being arranged in the middle, while the six remaining end portions are arranged uniformly distributed around the circumference and at as little distance as possible from the end portion that is arranged in the middle.

Possible applications for the particles or the aerosols are for validating and/or calibrating particle measuring devices and particle sensors and also for testing and assessing filters and catalysts. By introducing appropriate chemical components, the aerosol generated can also be used for the ageing of sensors, catalysts and filters. The use of the aerosols for measuring reaction kinetics makes possible the development of descriptive and/or predictive simulation models. Likewise, kinetic investigations of model aerosols can be taken as a basis for functional development for optimizing filter loading models and regeneration strategies.

Although the invention has been described with reference to specific exemplary embodiments, it is clear to a person skilled in the art that various modifications can be made and equivalents used as replacements without departing from the scope of the invention. Consequently, the invention is not intended to be restricted to the exemplary embodiments disclosed, but also to include all exemplary embodiments that fall within the scope of the appended claims. In particular, the invention also claims protection for the subject matter and the features of the subclaims independently of the claims referred to.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method for creating soot, using an aerosol generator configured as a soot generator, the method comprising:
   feeding at least one first fuel into a combustion chamber parallel to a longitudinal axis of the combustion chamber by the aerosol generator by at least a first feed line of a fluid feeding device that has at least three feed lines, each feed line having a respective end portion, the respective end portions of each feed line are arranged parallel to each other so that at least three fluids of different types are introduced into the combustion chamber unmixed and in a parallel inflow direction, the at least one first fuel being fed into the combustion chamber at a fixed height from a base of the combustion chamber;
   feeding at least one oxidizing agent into the combustion chamber parallel to the longitudinal axis of the combustion chamber by the aerosol generator by a second line of the fluid feeding device, unmixed and in the parallel inflow direction of the at least one first fuel, the at least one oxidizing agent being fed into the combustion chamber at the fixed height from a base of the combustion chamber;

feeding at least one of a second fuel into the combustion chamber parallel to the longitudinal axis of the combustion chamber by the aerosol generator by at least a third line of the fluid feeding device, unmixed and in a the parallel inflow direction of the at least one first fuel and the at least one first oxidizing agent, the at least one component being fed into the combustion chamber at the fixed height from a base of the combustion chamber; and burning the at least one fuel, the at least one oxidizing agent, and the at least one second fuel in at least one soot-particle-creating flame arranged in the combustion chamber to create aerosol comprising soot particles.

2. The method according to claim 1, wherein, at least two combustible gases, at least one oxidizing gas, and at least one of a reactive gas and an inert gas are introduced into the combustion chamber.

3. A method for one of testing and calibrating a particle measuring device configured as at least one of a particle sensor, a particle filter and a particle catalyst, comprising:

creating soot, using an aerosol generator configured as a soot generator by:

feeding at least one first fuel into a combustion chamber parallel to a longitudinal axis of the combustion chamber by the aerosol generator by at least a first line of the fluid feeding device that has at least three feed lines, each feed line having a respective end portion, the respective end portions of each feed line are arranged parallel to each other so that at least three fluids of different types are introduced into the combustion chamber unmixed and in a parallel inflow direction, the at least one first fuel being fed into the combustion chamber at a fixed height from a base of the combustion chamber;

feeding at least one first oxidizing agent into the combustion chamber parallel to the longitudinal axis of the combustion chamber by the aerosol generator by at least a second feed line of the fluid feeding device unmixed and in the parallel inflow direction of the at least one first fuel, the at least one oxidizing agent being fed into the combustion chamber at the fixed height from a base of the combustion chamber;

feeding at least one second fuel into the combustion chamber by the aerosol generator by at least a third line of the fluid feeding, unmixed and in a the parallel inflow direction of the at least one first fuel and the at least one first oxidizing agent, the at least one component being fed into the combustion chamber at the fixed height from a base of the combustion chamber;

burning the at least one fuel, the at least one oxidizing agent, and at least one second fuel in at least one soot-particle-creating flame arranged in the combustion chamber to create aerosol comprising soot particles; and feeding the aerosol comprising the soot particles to the particle measuring device.

* * * * *